United States Patent

Satsumabayashi et al.

[11] 3,975,028
[45] Aug. 17, 1976

[54] APPARATUS FOR SEALING A TRACK SHOE

[75] Inventors: Kazuyoshi Satsumabayashi, Kyoto; Takeshi Kato, Hirakata, both of Japan

[73] Assignee: Kabushiki Kaisha Komatsu Seisakusho, Tokyo, Japan

[22] Filed: Apr. 15, 1975

[21] Appl. No.: 568,290

[30] Foreign Application Priority Data
Apr. 16, 1974 Japan............................ 49-41809

[52] U.S. Cl............................. 277/94; 277/95; 305/11
[51] Int. Cl.² .............................. F16J 15/38
[58] Field of Search................ 277/95, 94, 81 R; 305/11

[56] References Cited
UNITED STATES PATENTS

| | | | |
|---|---|---|---|
| 2,394,012 | 2/1946 | Rayburn | 277/94 |
| 2,522,231 | 9/1950 | Loftis | 277/95 X |
| 2,906,562 | 9/1959 | Burgman | 305/11 |
| 3,841,718 | 10/1974 | Reinsma | 305/11 |

*Primary Examiner*—Samuel B. Rothberg
*Attorney, Agent, or Firm*—Oblon, Fisher, Spivak, McClelland & Maier

[57] ABSTRACT

Sealing apparatus which includes an elastic seal having end portions and at least one intermediate portion, all of such portions being interconnected yet axially spaced from each other whereby the seal is compressible. A projection is provided upon one end surface of the seal which is adapted to be disposed along the end portion of a bushing and extend within an annular space defined between the bushing and the link of the track shoe system, whereby penetration of earth and sand within a counterbored portion of the shoe system is positively prevented. An annular thrust ring may also be disposed within the counterbored portion of the system in a concentric manner with respect to the seal, the ring being disposed radially inwardly thereof, and in this manner, when large thrust forces are exerted upon the system, the thrust ring, interposed between the bushing and a bottom wall of the counterbored portion, will counteract the same.

10 Claims, 9 Drawing Figures

APPARATUS FOR SEALING A TRACK SHOE

BACKGROUND OF THE INVENTION

1. Field of the Invention

The present invention relates generally to sealing apparatus and more particularly to apparatus for sealing a track shoe for endless tracks of a tractor-type vehicle.

2. Description of the Prior Art

Heretofore, within apparatus for sealing track shoes for endless tracks of tractor-type vehicles, it has been found that while one type of apparatus exhibits good sealing properties the same apparatus cannot accommodate thrust forces, and while another type of apparatus can accommodate thrust forces, the same exhibits poor sealing properties; and still further, in the case of an apparatus having acceptable sealing properties and being able to withstand and accommodate thrust forces, the apparatus nevertheless does not prevent earth and sand brought about or interposed between the end surface of the bushing and the seal from invading or penetrating interiorly of the apparatus in the form of wedge which will tend to deleteriously affect the sealing properties of the apparatus.

For example, as shown within FIG. 1, when use is made of a seal made of polyurethane rubber a, which exhibits relatively good sealing properties, and foamed polyurethane b, the apparatus has the disadvantage that it has been unable to receive or withstand strong thrust forces whereupon the same is substantially poor in wear resistance, especially of the foamed polyurethane rubber b, and in addition, the elasticity of the same is lost upon absorbtion of muddy water and subsequent drying of the same.

Similarly, as shown within FIG. 2, when use is made of a pair of leaf springs c, such apparatus has been able to absorb thrust forces, however, because the contact of the sealed surface is substantially linear contact, this apparatus has exhibited poor sealing properties.

As illustrated within FIG. 3, when use is made of a bellows-type seal of rubber, such as, for example, a hard urethane rubber or a metal, the same has demonstrated a relatively good capacity for receiving thrust forces and has exhibited acceptable sealing properties, however, because the surface pressure transmitted from the contacting surface of the bushing to the contacting surface of the seal is high, a bellows-type seal wears rapidly and in fact a portion S thereof has been found to completely deteriorate over a period of time. Still further, a wedge formation of earth and sand has been formed within the area designated P, and consequently, such earth and sand, under pressure, has tended to enter the space or gap defined between the seal and the end surface of the bushing, the result being the deleterious loss of the effective sealing properties.

SUMMARY OF THE INVENTION

Accordingly, it is an object of the present invention to provide an improved apparatus for sealing track shoes for endless tracks of a tractor-type vehicle whereby the aforenoted disadvantages are overcome.

Another object of the present invention is to provide an improved track sealing apparatus which exhibits good sealing properties.

Still another object of the present invention is to provide an improved apparatus which is capable of withstanding the exertion of thrust forces thereon.

Yet another object of the present invention is to provide improved track sealing apparatus which exhibits good or substantial wear resistance and consequently a long service life.

The foregoing and other objectives are achieved according to the present invention through the provision of sealing apparatus which includes an elastic seal having end portions and at least one intermediate portion, all of such portions being interconnected yet axially spaced from each other whereby the seal is compressible. A projection is provided upon one end surface of the seal which is adapted to be disposed along the end portion of a bushing and extend within an annular space defined between the bushing and the link of the track shoe system, whereby penetration of earth and sand within a counterbored portion of the shoe system is positively prevented. An annular thrust ring may also be disposed within the counterbored portion of the system in a concentric manner with respect to the seal, the ring being disposed radially inwardly thereof, and in this manner, when large thrust forces are exerted upon the system, the thrust ring, interposed between the bushing and a bottom wall of the counterbored portion, will counteract the same.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views and wherein.

DETAILED DESCRIPTION OF THE PREFERRED EMBODIMENTS

Figure 1:
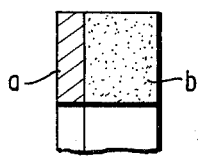
FIGS. 1–3 are schematic diagrams of conventional seals utilized within conventional sealing apparatus systems.
Figure 2:
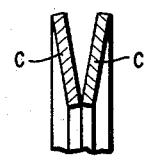
Figure 3:
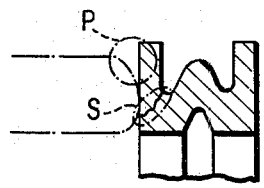
Figure 4:
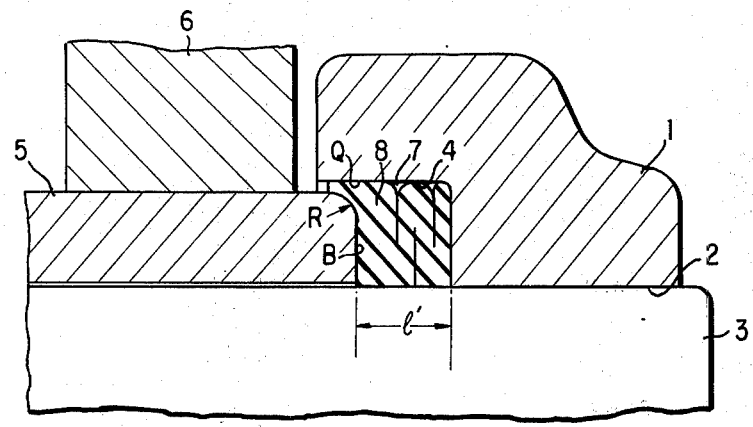
FIG. 4 is a partial, longitudinal cross-sectional view of one embodiment of a sealing system constructed in accordance with the present invention and showing its cooperative parts.

Referring now to the drawings, and more particularly to FIG. 4 thereof, a link 1 is provided with a pin hole 2 within which a pin 3 is inserted under pressure. A counterbored portion 4 of link 1 is concentric with pin hole 2 and a bushing 5 is rotatably engaged with said pin 3 while being simultaneously inserted under pressure into an adjacent link 6. The end portion B of bushing 5 projects into the counterbored portion 4 of link 1 so as to define therewith a chamber 7 within which a seal 8, made of, for example, rubber and exhibiting good elasticity and wear resistance characteristic of a hard urethane rubber or metal, is accommodated within a compressed state so as to fill the chamber 7 when in such state.

Figure 5:
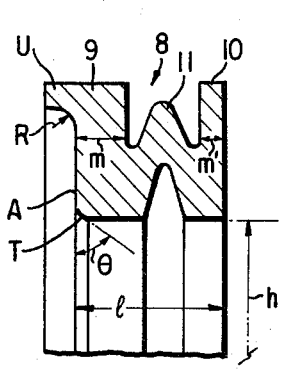
FIGS. 5–8 are various embodiments of seals which may be utilized within the system of FIG. 4.

The state of the seal 8 before it is accommodated within chamber 7 is shown within FIG. 5 and is seen to comprise an annular body which includes side piece portions 9 and 10 and an intermediate portion 11, whereby the entire seal is substantially W-shaped in cross section. Upon the outer surface of portion 9 contacting the end surface B of bushing 5, and at the outer periphery thereof, there is provided an axially extending projection U which extends along the end surface of the bushing 5 and within an annular area defined between bushing 5 and link 1 so as to prevent any earth and sand which may enter the gap defined between the links 1 and 6 from entering the chamber 7 whereby due to the wedging effect thereof, such would deleteriously affect the sealing property of seal 8. It is noted that the radius R of the inner peripheral surface of the projection U is made somewhat smaller than the corresponding radius R' of the end surface B of bushing 5 and when seal 8 is within its incorporated state, projection U is made to spread toward the outer periphery thereof and thereby provide good contact properties with the inner peripheral surface Q of counterbored portion 4 so as to increase the lip effect thereof and thereby prevent earth and sand from penetrating into the outer peripheral portion of seal 8.

It is further noted that although the sealing operation by means of seal 8 is accomplished upon both side surfaces of seal 8, because it is mainly accomplished at the interface between the end surface B of bushing 5 and the complimentary surface A of the side piece portion 9 of seal 8 which is in contact with end surface B, in order that the side piece portion 9 of seal 8 may adequately withstand abrasion, the thickness m of side piece portion 9 is made larger than the thickness $m'$ of the other side piece portion 10 which has a smooth surface for contacting link 1.

As will thus be apparent from FIGS. 4 and 5, when the seal 8 is disposed within the incorporated state, it is axially compressed such that its non-compressed width $l$ is reduced to a width $l'$, whereby seal 8 is always capable of forming a seal surface as a result of the transfer in the axial direction of bushing 5. It can be further appreciated that the intermediate portion 11 swells upwardly, or more particularly expands radially and the elastomeric seal is thus seen to fill the counterbored portion 4 whereby it is apparent that the sealing device can in fact accommodate considerable thrust forces.

When the end surface B of bushing 5 is ground, a tapered portion T, having an angle $\sigma = 10°-75°$, is provided upon the outside portion of the inner peripheral surface of the side piece portion 9 of seal 8 as shown within FIG. 5, and a lubricant, such as, for example, a gear oil, may be sealed within the gap defined between the tapered portion T, the inner peripheral surface of bushing 5, and the outer peripheral surface of pin 3. Alternatively, a lubricant, such as for example, "Teflon", which is a trademark for polytetrafluoroethylene, may be added to the material of seal 8, and in this manner, it is possible to reduce the coefficient of friction existing between the end surface B of bushing 5 and surface A of seal 8 so as to decrease the abrasion of surface A of seal 8. Still further, when a taper of approximately 10°–15°, as directed from the outer peripheral portion of seal 8 to the inner peripheral portion thereof, is imparted to surface A, it is possible to further improve the lubricating action upon surface A of seal 8.

Figure 6:
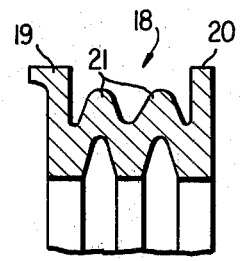

Referring now to FIG. 6, there is disclosed another seal, generally indicated by the reference character 18 which has two intermediate portions 21, the remaining structure, that is, end portions 19 and 20, and the function thereof, being the same as those of the structural end pieces 9 and 10 of the aforementioned embodiment illustrated within FIG. 5.

Figure 7:
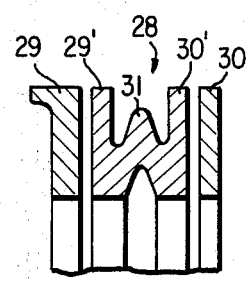

Similarly, with particular reference being made to FIG. 7, a seal, generally indicated by the reference character 28, is comprised of three sections, and in effect, divides the portions, corresponding to the side piece portions 9 and 10 within the aforementioned embodiment, into sections 29 and 29', and 30 and 30', respectively. Wear-resistant material is especially used in the fabrication of the outer side piece portions 29 and 30, and the function of seal 28 is substantially the same as that of the aforementioned embodiment disclosed within FIG. 5.

Figure 8:
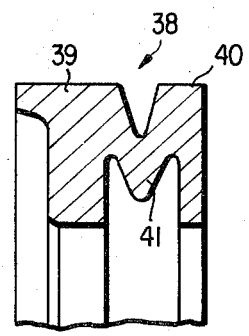

Turning now to FIG. 8, there is disclosed a seal, generally indicated by the reference character 38 which is provided with an intermediate portion 41 interposed between side piece portions 39 and 40 and which is conically configured but which faces the inner peripheral portion of the seal in a manner which is opposite to that of intermediate portion 11 of seal 8 of the aforementioned embodiment, however, the function of seal 38 is substantially the same as that of the seal 8 of the embodiment illustrated within FIG. 5, although the same is substantially inverted with respect thereto and of M-shape in cross-section.

Figure 9:
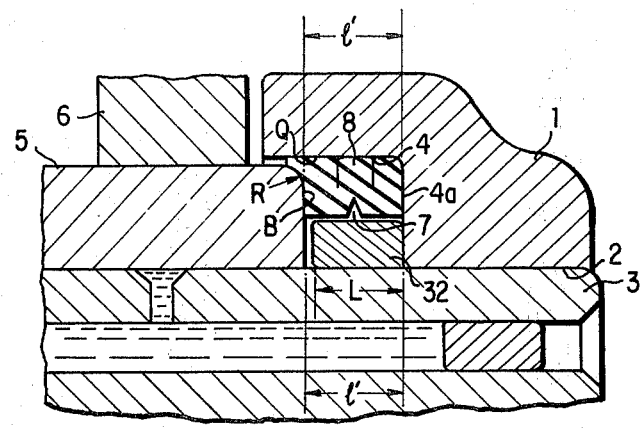
FIG. 9 is a view similar to that of FIG. 4 showing however another embodiment of a sealing system constructed in accordance with the present invention.

Referring now to FIG. 9, wherein another embodiment of the sealing arrangement is disclosed, the chamber 7 is defined by the end portion B of the bushing 5 and the interior end wall $4a$ of the counterbored, section 4 of link 1. Within chamber 7, there is accommodated the seal 8 as well as a thrust ring 32 disposed radially inwardly of seal 8. While seal 8 is compressed within chamber 7 so as to substantially fill the same in the axial direction, the ring 32 is disposed within an idle state. As seen from FIG. 5, the inner radius h of the seal 8 is made smaller than the outer radius of ring 32 so as to provide seal 8 with a tight friction fit upon ring 32 and thereby prevent seal 8 from rotating and relatively sliding upon the end surface B of bushing 5 whereby the service life of the same is substantially enhanced.

The thrust ring 32 is formed so as to have an annular configuration and may be fabricated of metal, rubber, plastic, or a suitable resin, the length of which L in the longitudinal or axial direction is slightly shorter than the distance $l'$ normally defined between the end surface B of the bushing 5 and the bottom wall $4a$ of the link 1, and it is so adapted that when large thrust forces act upon the apparatus and the seal 8 is axially compressed, the thrust ring 32 may in fact contact the end surface B of the bushing 5 as well as the bottom wall $4a$ of the link 1 with the result that both the bushing 5 and the thrust ring 32 are subjected to the thrust forces.

Thus, as noted above in detail, the apparatus of the present invention for sealing a track shoe of an endless track of a tractor-type vehicle comprises the provision of a seal having a projection U made of a material which exhibits good wear resistance and elasticity and the disposition of the seal and the projection U along the end surface of the bushing 5. The projection U is formed upon the outer surface of the outer periphery of the side piece portion 9 contacting the bushing 5 and forms a main seal surface therewith. At the same time, the thickness $m$ of the side piece portion 9 is made larger than the thickness $m'$ of the other side piece portion 10 which has a smooth end surface for contacting the link 1.

Still further, in order to accommodate, within a compressed state, the annular seal 8, the seal is provided with at least one intermediate portion 11 interposed between both side piece portions 9 and 10 and the same may in fact be accommodated within the counterbore portion 4 and more particularly within the chamber 7 defined by portion 4 of link 1 and bushing 5. In this manner, the apparatus of the present invention, for sealing a track shoe of an endless track of a tractor-type vehicle, can prevent earth and sand from penetrating to the end surfaces of both side piece portions, and can especially prevent earth and sand from invading, in the state of a wedge, the gap formed between the end surface of the bushing and the seal, as may be seen in the case of the conventional seal apparatus, for the projection U of the side piece portion 9 covers the end, corner and outer periphery of the bushing near the corner thereof. This result is further enhanced by the provision of thrust ring 32.

Furthermore, as seal 8 is made of a material having sufficient elasticity so as to be accommodated within a compressed state, the seal always maintains the surfaces sealed as a result of the axial transfer or movement of the busing 5, and still further and simultaneously therewith, because it is accommodated, within counter-bore portion 4, it can also receive thrust forces.

Still yet further, as the thickness m of the one side piece portion 9, which primarily performs the sealing function, is larger than the thickness $m'$ of the outer side piece portion 10, and because the seal 8 is made of a suitable wear-resistant material, it has many advantages, such as for example, a large endurance and long service life.

Obviously, many modifications and variations of the present invention are possible in light of the above teachings. It is to be understood therefore that within the scope of the appended claims the present invention may be practiced otherwise than as specifically described herein.

What is claimed as new and desired to be secured by letters patent of the United States is:

1. Apparatus for sealing a track shoe system of an endless track of a tractor-type vehicle, comprising:
   a pin;
   a link disposed about said pin;
   means defining a counterbored recessed portion within said link;
   a bushing disposed about said pin adjacent said link wherein the end of said bushing disposed toward said link is partially disposed within said recessed portion of said link so as to define therewith an annular space; and
   seal means disposed within said counterbored portion of said link and interposed between said end of said bushing and said link, said seal means being compressible in the axial direction within said counterbored portion and including an axially extending projection projected from the outer peripheral portion of said seal means disposed within said annular space,
   whereby sealing of said system is positively attained.
2. Apparatus as set forth in claim 1, wherein;
   said seal means is comprised of elastomeric material.
3. Apparatus as set forth in claim 1 wherein;
   said seal means comprises at least two end pieces and one upwardly extending intermediate portion,
   whereby said seal means is substantially W-shaped in cross-section.
4. Apparatus as set forth in claim 3, wherein;
   the thickness of the one of said two end pieces of said seal means which is disposed adjacent to said bushing is greater than the thickness of said other one of said pieces of said seal means,
   whereby said thicker piece of said seal means is able to withsatnd abrasion generated as a result of contact between said seal means and said bushing.
5. Apparatus as set forth in claim 3, wherein;
   said seal means includes two upwardly extending intermediate portions.
6. Apparatus as set forth in claim 3, wherein;
   each of said end pieces is divided into two pieces.
7. Apparatus as set forth in claim 1, wherein;
   said seal means comprises at least two end pieces and one downwardly extending intermediate portion,
   whereby said seal means is substantially M-shaped in cross-section.
8. Apparatus as set forth in claim 1, further comprising:
   a thrust ring disposed about said pin and concentrically within said seal means.
9. Apparatus as set forth in claim 8, wherein:
   the axial length of said ring is less than the normally compressed axial length of said seal means,
   whereby upon said seal means being further axially compressed between said bushing and said link, said bushing and link will contact said ring and tend to axially compress said thrust ring.
10. Apparatus as set forth in claim 1, wherein:
    said end of said bushing has a substantially flat end face disposed perpendicular to the axis of said bushing.

* * * * *